Patented Apr. 22, 1930

1,756,007

UNITED STATES PATENT OFFICE

MELVILLE FLETCHER PERKINS, OF TACOMA, WASHINGTON, AND CHARLES W. HANSON, OF PERTH AMBOY, AND BERRY MARVEL O'HARRA, OF WESTFIELD, NEW JERSEY, ASSIGNORS TO AMERICAN SMELTING AND REFINING COMPANY, OF NEW YORK, N. Y., A CORPORATION OF NEW JERSEY

PROCESS FOR TREATING MIXTURES OF OXY SALTS OF ARSENIC, ANTIMONY, AND TIN

No Drawing.  Application filed January 20, 1927. Serial No. 162,409.

This invention relates to a process for treating mixtures of alkali stannates, arsenates and antimonates, and more particularly to a process for treating mixtures of alkaline oxysalts of tin, arsenic and antimony which are formed as a by-product during the refining of lead.

The invention more specifically relates to the separation and recovery of the tin, arsenic and antimony contained in mixtures of sodium stannate, sodium arsenate and sodium antimonate either as a metal or as salts thereof in a marketable state of purity.

The invention still further relates to the utilization and subsequent recovery of any free caustic alkali, alkali chlorides, alkali carbonates and like substances which may be present in addition to the above mentioned stannates, arsenates and antimonates.

The invention further consists in the new and novel features of operation and the new and original arrangements and combinations of steps in the process hereinafter described and more particularly set forth in the claims.

The process, in accordance with the present invention, consists in lixiviating a mixture of the stannates, arsenates and antimonates from which it is desired to obtain and separate tin, arsenic and antimony with sufficient hot water to dissolve the stannates and arsenates while leaving the antimonates as an insoluble residue.

The antimonates may be removed from the solution by filtration and utilized as desired. A suitable reagent such as metallic tin, stannous salts, sodium sulphide, or their equivalents, is then added to the solution to precipitate various impurities contained therein such as antimony, tellurium, lead and copper. These impurities, if allowed to remain in the solution, would interfere with subsequent operations.

The solution may be passed through a filter or decanted for removing the above impurities, or should it not be essential in any particular instance to obtain substantially pure antimonates, this step may be omitted, in which case the impurities such as lead and copper may be removed together with the antimonates by a single filtration.

The hot solution of sodium stannates and arsenates may then be electrolyzed using insoluble anodes whereby metallic tin may be deposited at the cathodes, caustic alkali being liberated and the alkali arsenates remaining in solution.

The arsenates may then be recovered from the spent electrolyte by cooling the same to a temperature at which the arsenates are comparatively insoluble, whereby they will be caused to crystallize out. The crystals may then be removed by filtration from the caustic mother liquor, which may then be evaporated for the recovery of fused caustic alkali for subsequent use.

The arsenate may be recovered from the electrolyte, if desired, by treating the same with hydrated lime or milk of lime or an equivalent reagent whereby calcium arsenate is precipitated and the alkali radical is liberated as free caustic alkali. Any alkali carbonate present in the solution will at the same time be converted to caustic alkali.

The calcium arsenate may then be removed from the solution by filtration and the caustic alkali recovered by evaporation.

As a more specific example of the procedure to be followed in carrying out the invention, the treatment of a mixture of sodium antimonate, arsenate, and stannate resulting from the refining of lead by the Harris process will be described, although the process is not to be limited to these particular steps and substances but only in accordance with the appended claims.

The composition of such a mixture may vary widely, depending upon the analysis of the impure lead bullion from the refining of which it results, but the following analysis is typical:

| | Per cent |
|---|---|
| Arsenic | 8.1 |
| Antimony | 6.2 |
| Tin | 9.5 |
| Free caustic soda | 9.5 |
| Sodium chloride | 8.1 |
| Lead | 0.8 |

In the treatment of such a mixture according to the present invention it is first mixed with hot water and thoroughly agitated in a suitable container such as an iron tank equipped with steam coils for heating and with a motor-driven agitator. The amount of water used is preferably such as will give a solution containing approximately 45 grams of tin per liter, but this may vary within rather wide limits according to the strength of solution desired. The agitation and heating is continued until substantially all of the sodium arsenate and stannate, and the free caustic soda, sodium chloride and other soluble salts, are dissolved.

The resulting pulp is then forced through a suitable filter, such as, for example, a plate and frame filter press, and the solution separated from the insoluble sodium antimonate remaining in suspension. The sodium antimonate may be washed in the press with sufficient water to remove the dissolved salts, the wash water being returned to the above mentioned tank for the lixiviation of a succeeding batch of mixed sodium arsenate, stannate and antimonate.

The washed filter cake of sodium antimonate is dried and smelted with the addition of carbon for reduction to marketable metallic antimony if desired, or if sufficiently pure it may be marketed as sodium antimonate.

The filtrate from the filter press, consisting of a solution of sodium stannate and arsenate, together with free caustic, sodium chloride and minor quantities of various impurities, is collected in a second tank and agitated with powdered tin or other form of metallic tin, stannous salts, sodium sulphide, or other suitable reagent, to precipitate lead, copper, and other deleterious impurities. These precipitated impurities are then removed in a second filter press.

The purification of the solution may, if desired, be carried out before its separation from the sodium antimonate, in which case the sodium antimonate and the precipitated impurities are filtered off together. This procedure is somewhat simpler than performing the two steps separately, but does not produce the antimonate in as high a state of purity.

The solution after being purified, as above described, and after having the antimonates removed, may be treated for the recovery of tin by any suitable means such as by electrolysis. It may, for example, be placed in electrolyzing vats and maintained at a suitable temperature such as approximately 90° centigrade, at which temperature the reaction is most favorable. A coating of molten paraffin may be maintained on the surface of the electrolyte to prevent evaporation thereof, to prevent the formation of spray and to prevent the caustic from becoming carbonated from the carbon dioxide in the air.

Suitable electrodes such as insoluble iron anodes and tin cathodes may be employed and the current density maintained at an appropriate value for efficiently electrolyzing tin such as, for example, approximately 10 to 20 amperes per square foot.

By operating an electrolyzing vat under the above conditions, a firm deposit of tin may be obtained on the cathodes, the tin having a marketable state of purity such as 99%. The tin content of the solution may, by this process, be reduced to approximately 1 gram per liter, the presence of an excess of sodium arsenate not appreciably interfering with the deposition of tin from the sodium stannate.

The sodium combined as sodium stannate is released by electrolysis as free caustic soda.

The solution from which the tin has been removed may be cooled to approximately atmospheric temperature by suitable means such as by being transferred to tanks equipped with cooling jackets or coils. Mechanical agitation of the solution during the cooling is of advantage in producing crystals of arsenate instead of a gelatinous mass. At atmospheric temperature the sodium arsenate is largely insoluble and will crystallize out of the solution.

After cooling, the crystals are separated from the solution by filtration in a suitable filter, such as a plate and frame press or a Sweetland filter. The crystals of sodium arsenate may then be sold as such or may be used for the production of insecticides such as calcium arsenate. The filtrate may be evaporated for the removal of water and the production of fused caustic soda which can be re-used for refining a further quantity of lead bullion.

When solutions of sodium arsenate containing sodium stannate are cooled to crystallize out the sodium arsenate the crystals of the latter which are formed always contain a considerable amount of sodium stannate which cannot easily be removed from them, but if tin is largely removed from the solutions by electro-deposition before the sodium arsenate is crystallized, as above specified, the sodium arsenate crystals obtained contain practically no tin.

The sodium arsenate solution remaining after the electro-deposition of the tin may be utilized directly for the manufacture of calcium arsenate if it does not contain sufficient free caustic to interfere with the precipitation of calcium arsenate. In order to accomplish this the solution from the electrolytic tanks is agitated with the necessary amount of hydrated lime or milk of lime to form calcium arsenate with the sodium arsenate present. The resulting calcium arsenate may then be filtered off and washed in a suitable press. By the reaction between the lime and the sodium arsenate free caustic soda is formed simultaneously with calcium arsenate, so that the final solution contains the free caustic originally present, that liberated by the electrolysis of the sodium stannate, and that liberated by the precipitation of the calcium arsenate. This total amount of caustic soda may be recovered for re-use in refining a further quantity of lead bullion, by the evaporation of the solution after its separation from the calcium arsenate by filtration.

The process has been described particularly as applied to mixtures of sodium stannate, arsenate and antimonate, but is applicable to mixtures of alkaline oxysalts of tin, arsenic and antimony in general.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process for treating mixtures of alkali oxysalts including salts of tin and arsenic in which the arsenic is present in substantial amounts relative to the tin content, which comprises dissolving the arsenic and tin salts, heating the solution, electrolyzing the hot solution to deposit substantially the entire amount of tin contained therein and then crystallizing and removing the salts of arsenic.

2. The process for treating mixtures of alkali oxysalts of tin, arsenic and antimony, which comprises treating the mixture with hot water whereby the alkali oxysalts of tin and arsenic are dissolved, removing the residue containing insoluble alkali oxysalt of antimony, and removing substantially the entire amount of tin from the solution by heating the solution and electrolyzing the same whereby metallic tin is recovered therefrom.

3. The process of treating mixtures of alkali oxysalts of tin, arsenic and antimony in which the arsenic is present in substantial amounts relative to the tin content, which comprises treating the mixture with hot water whereby the alkali oxysalts of tin and arsenic are dissolved, removing the residue containing insoluble alkali salt of antimony, and electrolyzing the hot solution to deposit substantially the entire mass of tin contained therein.

In testimony whereof we have hereunto set our hands.

MELVILLE FLETCHER PERKINS.
CHAS. W. HANSON.
BERRY MARVEL O'HARRA.